United States Patent [19]

Vaughn et al.

[11] 4,006,486
[45] Feb. 1, 1977

[54] OPTICAL VIEWING, PHOTOGRAPHIC DEVICE FOR VAPOR GENERATOR

[75] Inventors: Jesse Glispin Vaughn, Wadsworth, Ohio; Steven Douglas Vander Kamp, Midland, Mich.

[73] Assignee: The Babcock & Wilcox Company, New York, N.Y.

[22] Filed: Sept. 19, 1975

[21] Appl. No.: 615,143

[52] U.S. Cl. .................. 354/76; 122/435
[51] Int. Cl.² .............. G03B 29/00; F22D 1/00
[58] Field of Search ........... 350/253; 356/76; 73/330; 122/491, 492, 435; 354/62–64, 76

[56] References Cited

UNITED STATES PATENTS

| | | | |
|---|---|---|---|
| 1,149,678 | 8/1915 | Parker | 354/76 |
| 1,227,196 | 5/1917 | Pocock | 73/330 |
| 2,821,966 | 2/1958 | Raynor | 122/491 X |
| 2,877,747 | 3/1959 | Happell | 122/492 X |
| 3,096,698 | 7/1963 | Stoutenburg | 354/63 |
| 3,256,865 | 6/1966 | Modrak et al. | 122/491 |
| 3,609,236 | 9/1971 | Heilman | 350/253 X |
| 3,759,151 | 9/1973 | Metz | 354/63 |
| 3,899,243 | 8/1975 | Haverkamp | 73/330 X |
| 3,914,032 | 10/1975 | Takano et al. | 354/62 X |
| 3,915,564 | 10/1975 | Urban | 354/62 X |

FOREIGN PATENTS OR APPLICATIONS

| | | | |
|---|---|---|---|
| 254,152 | 1/1970 | U.S.S.R. | 354/64 |

*Primary Examiner*—Donald A. Griffin
*Attorney, Agent, or Firm*—J. Maguire; R. J. Edwards

[57] ABSTRACT

In an illustrative embodiment of the invention, a steam and water drum of a steam generating system is provided with an optical viewing device, partially inserted through the drum's manway, which permits visual inspection or observation of the drum internals. The device comprises a transparent protective barrier, or window, at the end of the device within the drum, which eliminates fogging or moisture condensation on the window to ensure visibility, a water cooled lens system having a wide angle lens for increased angular exposure, and an eye piece or camera attached to the other end of the device disposed outside the drum.

5 Claims, 2 Drawing Figures

OPTICAL VIEWING, PHOTOGRAPHIC DEVICE FOR VAPOR GENERATOR

BACKGROUND OF THE INVENTION

1. Field Of The Invention

This invention relates to steam and water drums, and more particularly, to means for visually observing the operation of the internals of a steam and water drum.

2. Description Of The Prior Art

The importance in steam generation of providing clean dry steam has long been recognized, and as the operating pressure and capacities of steam generators have markedly increased, the need for removal of moisture and impurities from the steam to a greater degree has become more important to avoid harmful deposits in the associated superheater and/or turbine. Moreover, the functional nature of a steam and water drum is such that two fluid phases co-exist at a saturation temperature corresponding to the pressure in the drum. Therefore, the task of separating the entrained liquid droplets, i.e. moisture, from the vapor phase has generally been approached as a problem of mechanical separation. Various separating devices such as cyclone separators, flow directing baffle arrangements or scrubbers and a combination of these devices have been used to separate the relatively heavy moisture droplets and the impurities therewith from the vapor. For example, in a modern drum boiler the separation of steam from the moisture delivered by the steam water risers usually takes place in two steps. The first step, or primary separation, generally performed by cyclone type separators, removes nearly all the water from the mixture, so that, in effect, no steam is recirculated to the heating tubes. Secondly, secondary separators, e.g. steam scrubbers, removes substantially all solid contaminents from the steam such that the steam is sufficiently pure for use in high pressure turbines.

A performance analysis, however, of these steam and water drum separating devices in an operating steam generator system has generally been limited to long and arduous indirect test procedures. Accordingly, it is desirable to directly examine the effectiveness of the separating equipment, that is, to visually observe the performance of the equipment during operation and to actually see and/or visually record whether moisture, or water droplets, are being carried along with the issuing steam.

Furthermore, although abnormally high water levels produced from operational upsets, or "priming", or high concentrations of solids which produce foaming within the drum are comparatively rare occurrences in modern steam generation systems, it is also desirable to observe the water level surface conditions within the drum. In addition, water flow into and out of the drum may produce water level disturbances which are not readily discernable by any other means other than visual observation.

Accordingly, a visual observation device capable of operation within an operating steam and water drum, and capable of permitting visual observation of both the steam separating devices and the water level conditions of the drum is desired.

Attempts to view the internals of a steam drum by use of sight glasses and observation ports commonly known in the art have generally been frustrated by fogging of the sight glass window or port due to vapor condensation thereon. Furthermore, the field of vision available to these viewing windows was generally limited to a very narrow angle due to size considerations and location.

Therefore, there is a need to provide industry with a visual observation device capable of operation in a steam and water environment such as found in an operating steam and water drum for viewing the effectiveness of the internal equipment and the water level conditions within the drum.

SUMMARY OF THE INVENTION

These difficulties are overcome, to a large extent, through the practice of the invention. Illustratively, an optical viewing device for visual observation of the internals of an operating steam and water drum is provided having transparent protective window means at the end of the device to be inserted within the drum and lens means within the device to allow visual observation of the drum internals.

Specifically, an optical viewing device embodying principles of the invention includes a tubular structural member partially inserted within the steam and water drum having a transparent protective pressure barrier or window at the end of the member within the drum and an optical lens system within the tubular member, for example, a fish eye lens and associated lenses, for the production of a wide angle field of view of the drum internals at an eye piece disposed at the other end of the tubular member situated outside the drum. The optical lens system within the tubular member, moreover, is disposed in spaced relation with respect to the transparent protective boundary in order to, among others, accommodate thermal expansion of the viewing device and prevent distortion of the lens system from contact with an expanding member of the optical viewing device.

More specifically, an optical viewing device according to this invention further includes a cooling jacket disposed about the lens tube to prevent excessive heating of the lenses therein during operation of the drum, whereas, the transparent protective pressure barrier is not so cooled so that this member of the optical device may approach the internal working or saturation temperature within the drum and thereby prevent condensation thereon resulting in fogging of the window or an unclear view therethrough. Accordingly, the optical device remains clear or transparent at all working conditions of a steam and water drum, for example, 3,000 psi a pressure and about 695° F saturation temperature, since there is substantially no temperature difference between the transparent protective pressure barrier and the vapor temperature within the drum to result in condensation of fogging on the window. Furthermore, by use of a wide angle fish eye lens the viewing device may be angularly inserted within the drum with the window disposed relatively close to the normal operating water level, which not only permits a view of the separating equipment and the water level, but also, allows for cleaning or washing of the transparent protective pressure barrier, in the event of scale or other particle contaminant build up thereon, by simply raising the water level in the drum to clean or wash the window free of particle build up. In addition, by proper design, the optical viewing device may be attached to and inserted through a manway cover for introduction into the drum at a manway therein. In this manner, not only is it possible to readily observe the internal conditions within the drum, but also, the optical device may be readily inserted within and removed from a steam and water drum without producing any new aperture or opening through the walls of the drum and a corresponding plug for closing the opening when the viewing device is removed from the drum, which would be subject to stringent drum standards and requirements.

Various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DETAILED DESCRIPTION OF THE PREFERRED EMBODIMENTS OF THE INVENTION

For a more complete appreciation of the invention, attention is invited to the following description of an illustrative embodiment of the invention, as shown in the attached drawings.

Figure 1:
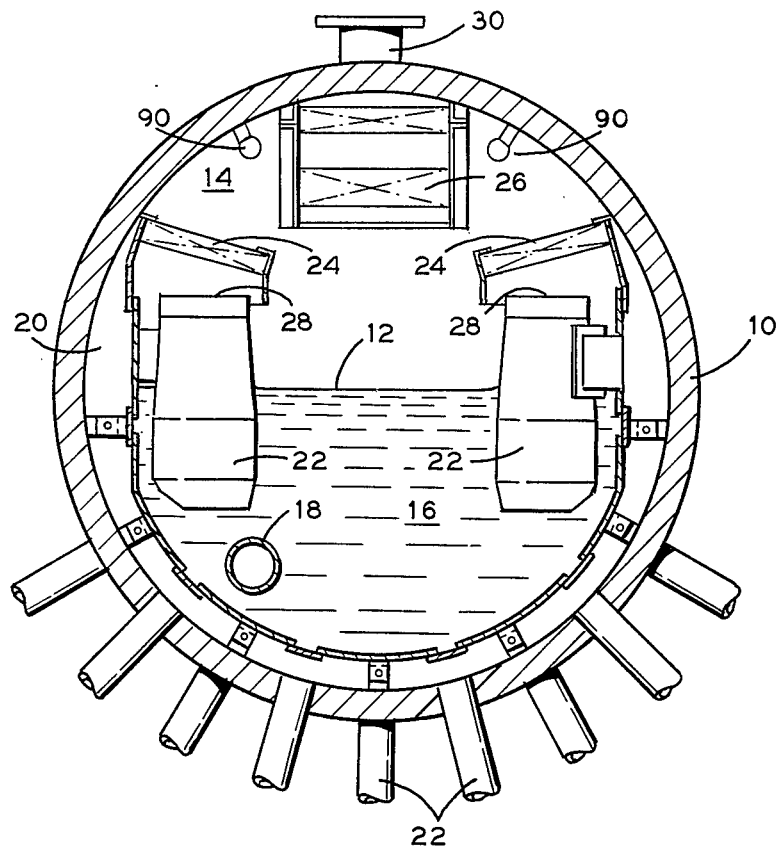
FIG. 1 is a cross-sectional view of a steam drum and some of the internal components therein.

In the drawings, FIG. 1 illustrates a steam and water drum 10 typically found as a component of a high pressure steam generator (not shown), in which the drum 10 is formed as an elongated cylinder, closed at its ends by drum heads (not shown). During normal operation, a liquid level 12, maintained at about the horizontal centerline of the drum, forms the boundary between the upper steam or vapor space 14 and the lower water or liquid space 16. Feedwater is introduced into the water space 16 through openings (not shown) in the feed pipe 18 which is submerged in the water space 16 and extends parallel to the longitudinal axis of the drum 10. Water from the drum 10 circulates downwardly to the heat absorption areas of the steam generating unit through downcomer tubes (not shown). After the water is heated, the resulting steam and water mixture is discharged within the drum in a steam and water mixture inlet chamber 20 by a plurality of steam generating tubes 22 communicating with the inlet chamber 20. In flow communication with the inlet chamber 20 are a plurality of primary separators 22 disposed longitudinally along the drum and partially immersed within the water or operating fluid of the drum. In addition, secondary separators 24 and 26 are disposed in flow communication with the steam or vapor outlet end 28 of the separators 22. Accordingly, in operation, the steam and water mixture enters the drum 10 or, more specifically, enters the inlet chamber 20 through the tubes 22 and is guided tangentially into the separators 22 wherein the primary separation of the moisture and impurities from the steam takes place. The greatly purified and nearly dried steam flows upwardly out of the separator and through the scrubbers 24 and 26 which further reduce the moisture and entrained impurities in the steam before it passes to a steam line 30.

Figure 2:
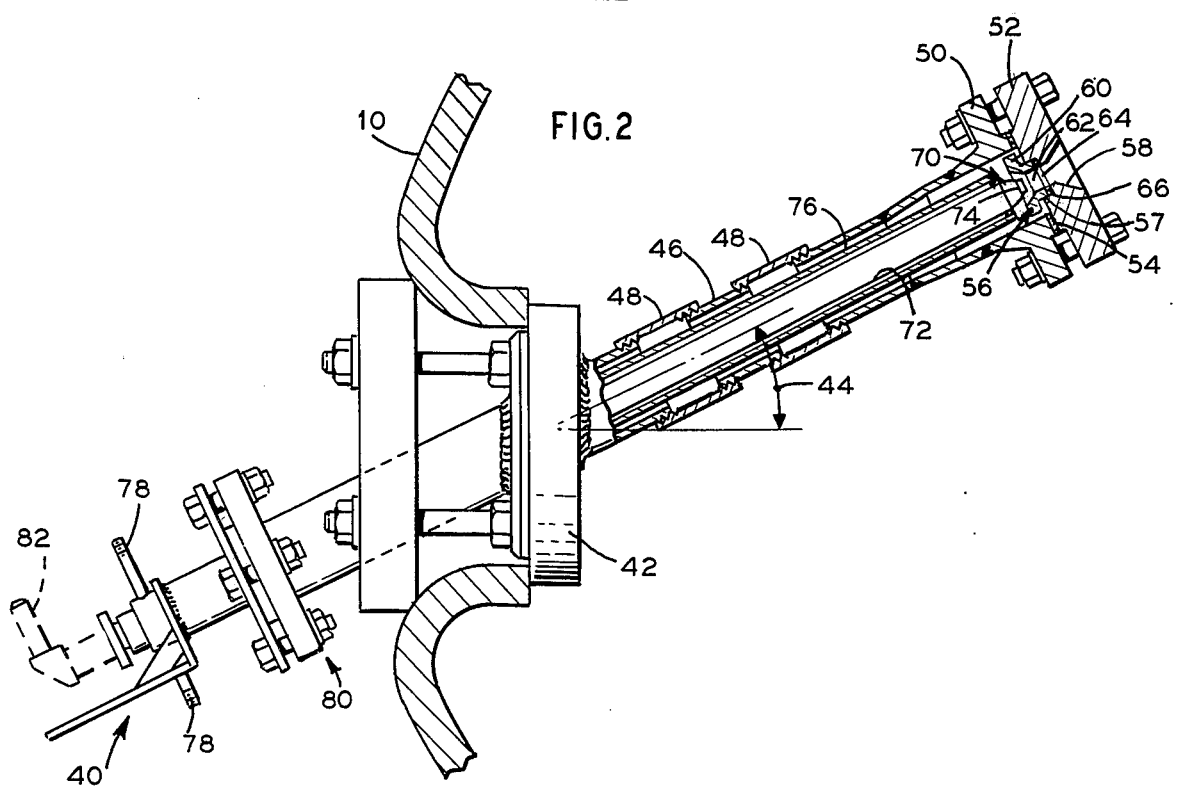
FIG. 2 is a partial section of a steam drum embodying the invention shown partially in section.

Referring now to FIG. 2, a steam drum 10 is schematically shown in partial longitudinal section having a visual observation device or probe 40 according to a preferred embodiment of this invention. As shown in this embodiment of the observation device 40, the probe extends through a man-way cover 42 at an inclined angle 44 with respect to the horizontal. Although an angle 44 of about 17° is generally preferred for viewing both the water level and the separating equipment within the drum when using the man-way entrance for probe insertion, other angles may be required depending upon the location of the probe and the type of viewing lens system being employed. Attached to the man-way cover 42 and extending outwardly from both sides thereof is an outer tubular structural member or pipe 46 of the probe 40. The distance of projection of the pipe 46 into the drum 10 is adjustable to some extent by couplings 48, however, the probe projection into the drum 10 is generally limited by the type of and/or size of the lens system being used. Attached to the pipe 46 is a flange 50 which attaches the view port window flange 52 to the probe or more specifically to pipe 46. A gasket 54 seals the interface between the pipe flange 50 and the window flange 52 from the high pressure and temperature of the steam and water environment.

A view port window or transparent protective pressure barrier 56 is seated on a lip 57 of the flange 52 and attaches thereto in axial alignment with a flange opening 58. The window 56 comprises a cover plate 60, a transparent pressure barrier or glass window 62 and a transparent mica protective shield 64 to prevent steam etching of the glass 62. Sealing gaskets 66, only one being shown, are employed between mating members of the window and between the window 56 and flange 52 effectively sealing the inside of the optical device 40 from the steam and water drum environment.

Disposed within the pipe 46 in optical alignment with the window 56 is a lens system 70. In this preferred embodiment of the invention, the lens system 70 is a lens tube 72, e.g. a $F_{1.2}$ 48 inch lens tube, as made by the Lenox Instrument Co., a unit of Esterline Corporation of 115 East Luray Street, Philadelphia, Penn. 19120, having a fish-eye lens 74 and a water cooling jacket 76. As shown, the fish-eye lens 74 is disposed in spaced relation to the window 56 in order to prevent thermal expansion pressure build up between the lens and the window and/or lens distortion. The lens system 70, moreover, extends outwardly from the drum 10 within the pipe 46 having an outside end of the lens system attached to the pipe through a flange assembly 80. Furthermore, the lens system also incorporates an eye piece 82, shown in phantom, or a camera (not shown) attached to the outside end of the probe 40 for viewing and remote viewing and recording respectively.

The water jacket 76, moreover, of this particular lens tube only supplies a cooling flow, via cooling lines 78, to the lens system 70. More particularly, water is supplied to the water jacket 76 surrounding the lens tube 72, but not to the annulus between the water jacket 76 and the pipe 46, to prevent excessive heating of the lens tube. In this embodiment, the above described lens tube is thermally rated for a maximum temperature of about 350° F, whereas the fish eye lens 74 is rated at 750° F and the steam drum internal temperature is generally on the order of 695° F. Furthermore, cooling of the transparent protective pressure barrier or window 60 would establish a substantial temperature difference across the transparent window and would establish condensation or fogging thereon obscuring the otherwise transparent window.

Visual observation of the drum internals, in accordance with this invention, further requires a "lighting" system, such as a light source 90 (FIG. 1), disposed within the drum and capable of operation in the steam and water environment therein. Typically, the light source employed in this embodiment of the invention comprises a plurality of G.E. mini lamp No. 1958 light bulbs, as produced by the General Electric Co., connected to an electrical power supply through insulated fittings (not shown). Typically, in this embodiment of the invention the insulated fittings, for example, CONAX Electrode Glands, as produced by the Conax Corporation of 2300 Walden Avenue, Buffalo, N.Y., extend through the man-way cover 42.

The installation of this embodiment of the observation system presently requires two man-ways, generally one at each end of the typically cylindrical drums. Specifically during installation, the lights are attached in any convenient manner within the drum and the man-way cover with only the probe pipe 46 attached is persuaded through the man-way. Once inserted within the drum, the insulated fittings are attached to the man-way cover which is then set in place. Thereafter, the lights are electrically connected to the fittings and the transparent window and associated flange is installed on the internal end of the probe. Although the lens tube may be installed at this time, it is generally sound practice to first electrically test the circuit for shorts and to hydrostatically test the unit, drum and probe, for leaks. In addition, the life of the light bulbs may be extended by hydrostatically testing the unit without the bulbs installed.

In operation, the drum is brought up to a typical working temperature and pressure, the lights are activated and viewing is commenced. As explained above, fogging of the window, which troubled prior art devices, is prevented during operation by allowing the probes' window to reach substantially the working temperature within the drum and thereby prevent condensation on the window. Further, the operation of this probe is not affected by particle or contaminant build up during long observation periods because the probe may be cleansed during drum operation, by merely increasing the drum water level to sufficiently cover and thereby wash the window clean.

In accordance with the present invention, wide angle visual observation of the internal components of and the water level within an operating steam and water drum is obtainable without fogging of the device by the drum vapor. Furthermore, the device is readily attachable to and removeable from the steam and water drum and, also, permits a simple method of washing scale or other particle contaminant build up on the window.

What is claimed is:

1. In combination with a drum having an upper steam space and a lower water space, steam and water separating means disposed within the drum, incandescent lamp means disposed within the drum to illuminate the interior thereof, and a device for viewing the illuminated interior, said device having concentrically spaced inner and outer tubes extending into the drum, an annular plate mounted on the outer tube end within the drum, said plate defining a viewing port fitted with a glass window and including a transparent mica shield fronting the drum interior, said inner tube end within the drum being capped by a fish eye lens facing the glass window, and an eye piece being attached to the inner tube end outside the drum, a sleeve interposed between the inner and outer tubes to define an annular passageway surrounding said inner tube, and means for circulating a cooling fluid through said passageway.

2. The combination according to claim 1 including the viewing port and fish eye lens being disposed within said vapor space.

3. The combination according to claim 1 including at least one drum end opening, a removable closure plate covering the opening and accommodating the insertion therethrough of said inner and outer tubes, the outer tube being seal welded to said closure plate.

4. The combination according to claim 3 including the inner and outer tubes having their common central axis sloped upwardly in the direction of said drum.

5. The combination according to claim 4 wherein an included angle of approximately 17 degrees is formed by said common axis intersecting a horizontal line.

* * * * *